May 1, 1928.
R. STAR
AUTOMATIC VALVE FOR GAUGES
Filed March 26, 1925
1,667,877
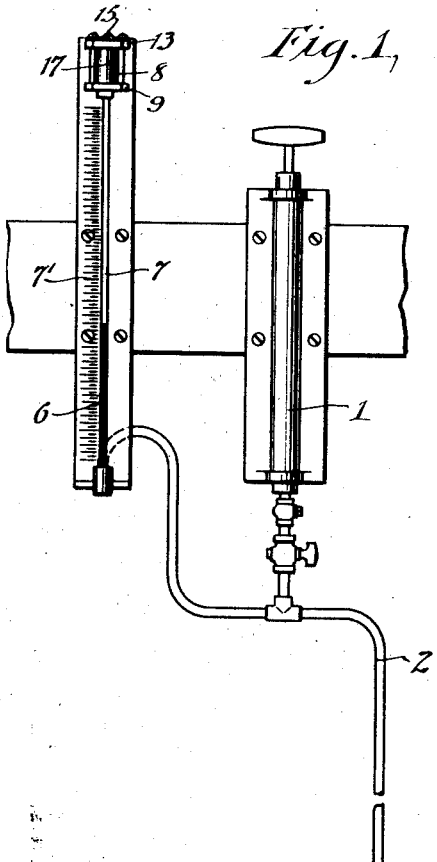
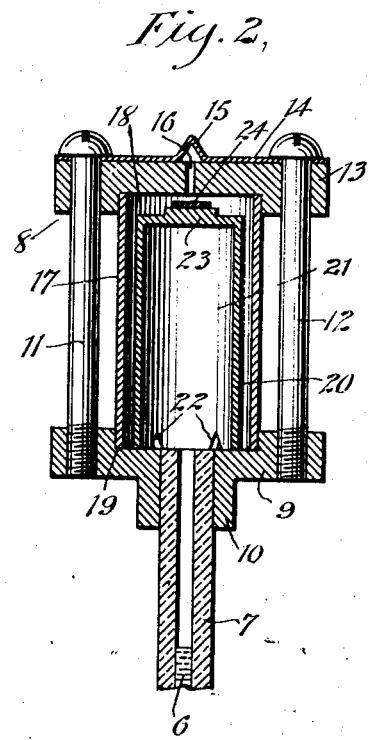
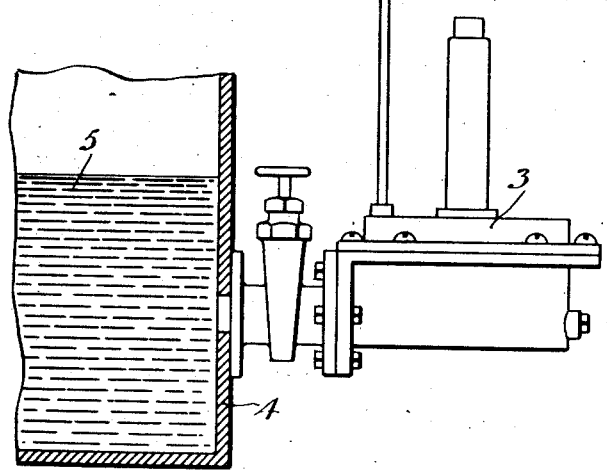
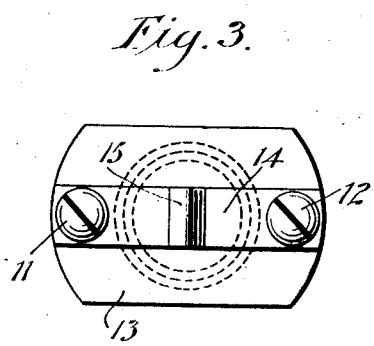
WITNESSES
Edw. Thorpe
A. L. Kitchin
INVENTOR
Richard Star
BY
ATTORNEYS Patented May 1, 1928.

1,667,877

UNITED STATES PATENT OFFICE.

RICHARD STAR, OF BROOKLYN, NEW YORK.

AUTOMATIC VALVE FOR GAUGES.

Application filed March 26, 1925. Serial No. 18,641.

This invention relates to valves for gauges and particularly to an improved valve used in tank gauges and has for an object to provide a construction wherein the tank gauge may be caused to properly function without danger of losing any of the mercury forming part thereof.

Another object of the invention is to provide an air gauge valve used in connection with a mercury gauge wherein the parts are so formed that the mercury will confine and then compress a quantity of air for closing the valve and preventing the mercury from passing through the valve.

A still further object of the invention is to provide a valve for gauges wherein the mercury column is used for indicating certain facts, the parts being so formed that the mercury will be caught when accidentally or otherwise forced from the mercury carrying member, and later automatically returned to its former position.

In the accompanying drawing—

Figure 1 is a view partly in elevation and partly in section showing a tank gauge with an embodiment of the invention applied thereto.

Figure 2 is a longitudinal vertical sectional view through the valve shown in Figure 1, the same illustrating in detail certain features of the invention.

Figure 3 is a top plan view of the structure shown in Figure 2.

In tank gauges used for indicating the level of oil or other liquid therein, means have been provided heretofore for indicating such level by a mercury column. This mercury column is moved upwardly under the action of air acting against the pressure of the liquid in the tank so that when the air pressure and the liquid pressure are the same, the movement of the mercury will cease and thereby indicate the depths of the liquid. In a device of this kind, an air pump 1 is provided which pumps air into the air system 2 which is preferably a comparatively small pipe. This pipe is connected to what is usually termed an actuator 3 connected to the tank 4 carrying a liquid 5. The liquid 5 is allowed to pass into the actuator 3 so that air in the pipe or system 2 must balance the pressure of the liquid in order to show accurately the amount of oil in tank 4. When this has been done, the mercury 6 in the glass tube 7 will be forced up to the desired point and the graduations 7' will indicate the level of oil. In order that the mercury 6 may travel upwardly properly, the upper end of the glass tube 7 is open and the air will thereby be allowed to escape freely. Gauges of the type described have been heretofore used and, therefore, form no part of the present invention. Also, the particular gauge shown in Figure 1 is disclosed and claimed in my prior application for patent, Serial No. 1,969. In this prior application, when the structure shown in Figure 1 is used and pump 1 is operated rather quickly a number of times, the pressure in the pipe 2 will rise so quickly as to almost instantly project all or a large part of the mercury 6 out through the top of the tube 7. When there is nothing provided for catching the mercury, it is completely used and in any event, the testing desired will not be accomplished.

In the present invention, an improved valve 8 is provided at the top of the tube 7 which will catch the mercury and return the same to the tube 7 so that an accurate reading may be secured when the pump 1 is properly operated. The valve 8 is shown in detail in Figures 2 and 3 from which it will be seen that this valve is provided with a base 9 having a hollow extension 10 for receiving the upper end of the tube 7 which may be held in place by friction or in any desired way. A pair of screws 11 and 12 are threaded into base 9 and extend through a cap 13 as well as through a plate 14, which plate has a raised portion 15 positioned centrally thereof. The cap 13 is also provided with a small passage-way or vent 16 which permits air to enter and leave the valve 8 and the tube 7. An outer shell 17 is mounted in a socket or recess 18 of cap 13 and in a socket or recess 19 in base 9. The shell 17 is preferably held in place by friction though it might be held in place by adhesive or other suitable means. However, the parts are fitted together so as to be substantially air-tight. A tubular valve member 20 is loosely mounted in casing 17, said valve member being provided with a comparatively long bore 21. One or more notches 22 are provided in the bottom edge of the valve member 20 so as to provide free communication for the air between the interior and exterior of the valve member 20 at the bottom. The valve member 20 is provided with a closed top or end 23 carrying a packing washer or pad 24 which is adapted to press against the cap 13 and cover the vent 16 when valve member 20 is raised. The A-shaped section 15 of strip 14 is provided in order to permit air to freely enter and escape from vent 16 and at the same time protect the vent against the entrance of foreign matter.

In operation, whenever pump 1 is operated in the proper manner, the mercury 6 will gradually move upwardly until it indicates the proper level of liquid 5. In case the pump 1 should, however, be operated rather forcibly a number of times, the mercury 6 would quickly move upwardly and out the upper end of tube 7. As it moves out of the upper end of tube 7 it will pass upwardly into the valve member 20 and close the notches 22 as well as confine a large quantity of air in the upper part of the valve member. As the mercury continues to move upwardly into the valve member 20, it will compress the air therein more and more and eventually raise the valve member until the washer or gasket 24 has completely closed the vent 18. If additional mercury moves upwardly and out of the upper end of tube 7 after vent 18 has been closed, it will merely compress the air in the valve member 20 and possibly a small quantity will pass through apertures 22 but will not rise very far in the casing 17. As soon as the pressure in the system 2 has been reduced, the mercury will automatically, under the action of gravity and the action of compressed air, move back into tube 7 until it is finally all back in tube 7 and a quantity of air is drawn in through vent 16 which is open as the valve member 20 moves back to the position shown in Figure 2, as soon as the pressure thereon has been removed. By this action of the valve not only is the mercury saved from loss but is automatically reinserted into the tube 7 and the accuracy of the instrument is not impaired.

What I claim is:—

A valve of the character described, comprising a base recessed on its inner face and having an opening at the center of the recess, said opening serving as inlet and exit for the liquid, a cap recessed on its inner face and provided with an air vent at the center of the recess, an open ended shell between the base and cap with its ends in the recesses of the cap and base, a plate on the cap and having a transversely extending raised portion over the air vent and forming a guard for the same, bolts securing the base and cap together and the plate on the cap, and an elongated cylindrical hollow valve member loose in the shell and having an open and notched lower end and a closed upper end provided with a pad, said valve member normally resting upon the bottom of the recess of the base over the opening thereof, and its closed upper end spaced from the cap below the air vent.

RICHARD STAR.